Nov. 29, 1966     W. A. SOURS     3,288,028
SOUND AND SLIDE SYNCHRONIZING ARRANGEMENT
Filed Aug. 31, 1964
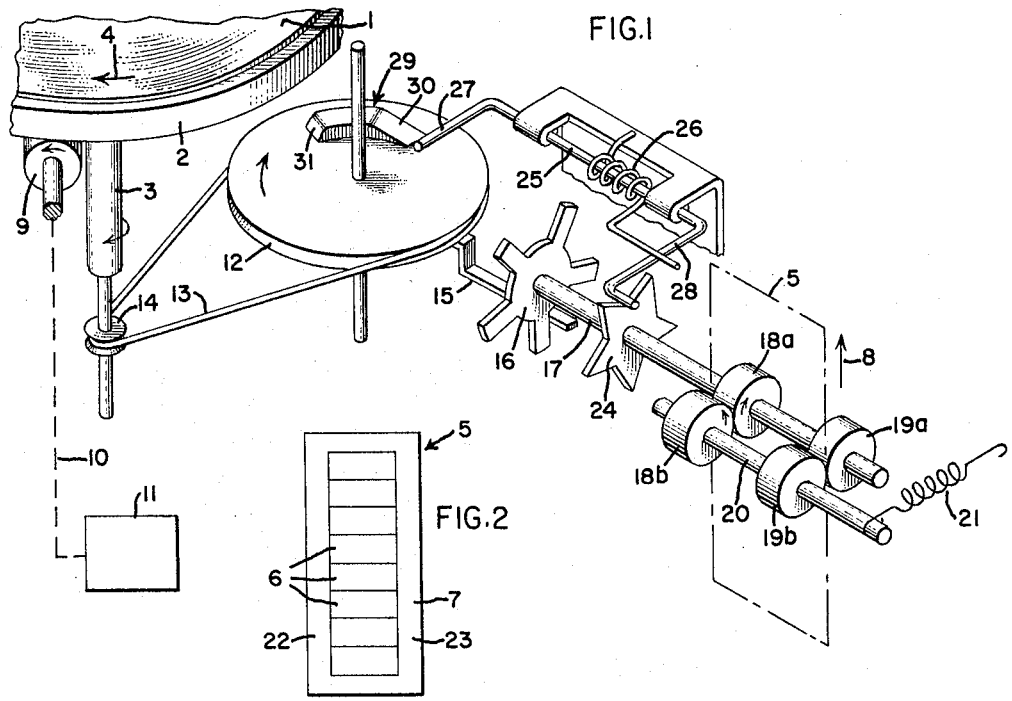
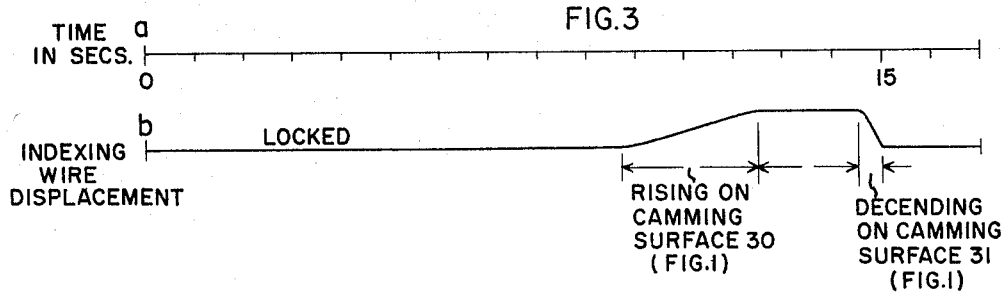
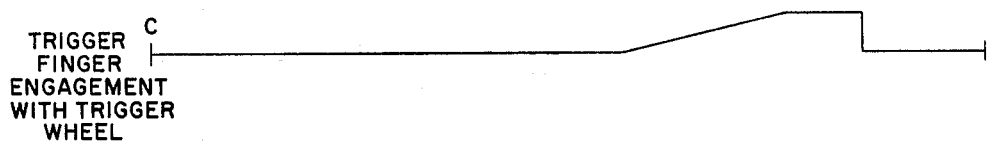
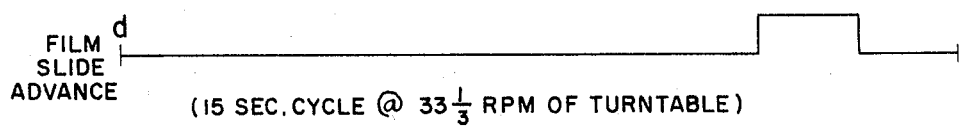
(15 SEC. CYCLE @ 33⅓ RPM OF TURNTABLE)

United States Patent Office
3,288,028
Patented Nov. 29, 1966

3,288,028
SOUND AND SLIDE SYNCHRONIZING
ARRANGEMENT
William A. Sours, Utica, N.Y., assignor to General
Electric Company, a corporation of New York
Filed Aug. 31, 1964, Ser. No. 393,049
8 Claims. (Cl. 88—28)

This invention relates to an arrangement for automatically displaying pictures with the playing of a sound recording, and particularly to an arrangement for advancing photographic film slides intermittently for viewing purposes in time synchronism with the continuous playing of the sound recording.

A need exists for a low-cost, sturdy, reliable device which can play sound recordings, such as phonograph records, and also advance photographic film slides for viewing purposes in time synchronism with the playing of the record. Such a device which can be mass produced would fulfill an important entertainment and educational need.

Difficulties have been encountered in the past, particularly where inexperienced operators, particularly children, have attempted to operate such devices. Handling of the film slides during operation would jam the machines. Difficulties were encountered in inserting the film slides into the mechanism for viewing purposes. Furthermore, such devices have required expensive and complex components to maintain good film registration after each film advance, and to provide a relatively rapid film advance between successive film viewings.

In attempting to reduce the cost of manufacturing such a device, one approach involves using a single motor for driving the record turntable and for advancing the film slides. Design difficulties arise, however, when the phonograph record must be rotated in a horizontal plane—whereas the film slides are required to be advanced in a vertical plane. Further difficulties arise when it is required that the film slide drive shaft must rotate in an intermittent fashion, and the turntable drive shaft must rotate continuously, all without loss of synchronism between film slide advancement and record playing.

It is therefore an object of this invention to provide a sturdy, reliable device capable of carrying out these complex functions and which can be manufactured in large quantities at low cost.

A further object is to provide an improved film slide changing mechanism for operation with a phonograph record player.

A further object of this invention is to provide a new and improved arrangement for operating a phonograph record turntable and an intermittent slide film advancing mechanism from the same power take-off shaft.

A further object is to provide a film slide changing arrangement with new and improved means for assuring the locking of the slide film drive shaft during the period between slide film changes.

It is a still further object of this invention to provide a new and improved arrangement for intermittently advancing film slides in time synchronism with the playing of a phonograph record.

Briefly, in accordance with one embodiment of this invention, there is provided an arrangement for advancing a film slide drive shaft, which is adapted to rotate about a first axis, step by step in synchronism with the playing of a phonograph record where the record is adapted for rotation about a second axis orthogonal to the first axis. A locking means and a driven means are carried by the film slide drive shaft. A drive wheel is rotated about an axis parallel to the second axis by means of a belt coupled to the spindle which is employed to drive the turntable on which the phonograph record is mounted for rotation. This drive wheel is provided with a trigger finger which extends radially therefrom for engaging said driven means to cause rotation of the driven means an angular distance corresponding to one step of the film slide drive shaft advance. The drive wheel is also provided with a camming surface. Means are provided for locking said film slide drive shaft automatically against rotation when said drive wheel trigger finger moves out of engagement with said driven wheel. The locking means comprises a first and second arm with resilient means for urging the second arm towards said locking wheel for locking it against rotation. This resilient means also urges said first arm against said camming surface. The first arm is adapted to respond to the camming action of said camming surface for overcoming the urging of the resilient means to move the second arm out of locking engagement with the locking wheel substantially as the drive wheel engaging means causes the rotation of the driven wheel. The first arm is also responsive to a further camming action of the camming surface and the urging of the resilient means to move the second arm back into locking engagement with the locking wheel substantially as the drive wheel engaging means moves out of engagement with the driven wheel.

The novel features which I believe to be characteristic of my invention are set forth with particularity in the appended claims. My invention itself, however, both as to its organization and method of operation together with further objects and advantages thereof, may best be understood by reference to the following description taken in connection with the accompanying drawings wherein:

FIG. 1 illustrates schematically an embodiment of the present invention;

FIG. 2 illustrates in greater detail the elements of a film slide;

FIG. 3 illustrates part schematically, part graphically, one cycle of intermittent slide film advance and locking action.

Referring to FIG. 1 there is shown a phonograph record 1 mounted on a phonograph turntable 2 and adapted to be rotated about a vertical or first axis represented by the spindle 3 by means of the turntable in the direction of arrow 4 during the process of playing the record. As is well known, a tone arm responds to the undulations in the record surface to detect the sound that is recorded there, and electrical circuits amplify these detected sounds before application to a loudspeaker for listening purposes. As the record revolves, the tone arm traverses the successive spiral tracks of undulations on the record reproducing the sounds recorded therein.

Referring to FIG. 2 there is shown a film slide 5 consisting of a plurality of pictures or photographic color transparencies 6 mounted in a slide holder 7 formed of cardboard or other suitable material. It is desired that each of these transparencies be successively advanced into viewing position and in time synchronism with the playing of the record. In one embodiment, the transparencies are successively advanced in a vertical plane to be intercepted by light from a projection lamp which passes through the transparencies and is projected onto a screen by suitable optics.

Referring to FIG. 1 again, the film slide is shown in dashed line form and bears the reference number 5. Thus as the record continuously turns in the direction 4, the film slide is to be advanced intermittently one transparency frame at a time in the direction of arrow 8 for viewing purposes. It is desirable that the intermittent drive action be characterized by a relatively rapid film advance between successive film viewings. It is also desirable that both the continuous record rotation and the intermittent film slide advance be powered by a single motor. This application is accomplished in the following manner.

The phonograph turntable 2 is driven by means of an idler wheel 9 whose shaft is in turn mechanically coupled through suitable speed changing arrangements indicated by the dotted line 10 to a motor 11. Spindle 3 rotates continuously, for example, at a speed of 33⅓ r.p.m. under control of motor 11. Cam wheel 12 is driven about a second axis parallel to the turntable axis by means of a rubber belt drive 13 coupled to a pulley 14 mounted on the spindle 3. The ratio of the diameters of the cam wheel 12 and of the spindle pulley 14 results in cam wheel 12 making one revolution for every eight revolutions of the spindle 3. Cam wheel 12 has a trigger finger 15 extending radially therefrom and which rotates with cam wheel 12.

Driving power for the film lide advancing function is provided by a trigger wheel 16 having five sprocket teeth as shown. Trigger wheel 16 is spaced from cam wheel 12 and positioned such that one rotation of trigger finger 15 causes trigger wheel 16 to advance one sprocket tooth. Thus 5 revolutions of finger 15 causes trigger wheel 16 to rotate one complete revolution. Trigger wheel 16 is keyed to the same shaft 17 on which two driving rollers 18a and 19a are keyed. Thus for every one tooth advance of trigger wheel 16, rollers 18a and 19a advance one-fifth of a revolution. Cooperating with rollers 18a and 19a are rollers 18b and 19b which are keyed to a common shaft 20. Film slide 5 is inserted between the pairs of rollers 18a, 18b and 19a, 19b. Spring 21 causes roller 18b to urge one portion of film slide 5 into friction rolling engagement with driving roller 18a and causes roller 19b to urge another portion of film slide 5 into friction rolling engagement with driving roller 19a. In one embodiment rollers 18 and 19 are dimensioned such that rollers 18a and 18b ride along one side of holder 7, say 22 of FIG. 2, and rollers 19a and 19b ride along the other side, say 23 of FIG. 2. The result is that for each sprocket tooth advance of trigger wheel 16, film slide 5 is advanced to the next transparency frame for viewing.

To insure proper registration of each transparency as it is advanced into viewing position, a locator wheel 24 having the general appearance of a 5 pointed star is keyed to the same shaft 17 as trigger wheel 16. The functions of the locator wheel are several. As will be explained shortly, the locator wheel locks the film slide between transparency advance. It also provides accurate indexing of the transparencies for viewing, thereby insuring proper film advance under control of the trigger wheel, and thereby also in synchronism with the rotation of turntable 2—all under control of the single motor 11.

Cooperating with locator wheel 24 is index wire 25 formed of metal or other suitable stiff material. Index wire 25 is biased by means of a resilient spring 26 so that in its normal position, a first arm or end 27 is located just out of interference contact with the surface of cam wheel 12. The second arm or other end 28 of index wire 25 rests in the notch formed by the teeth or apices of the locator wheel 24. As cam wheel 12 makes one revolution, the first arm 27 of index wire 25 is caused to contact the sloping curved surface of a cam 29 which is mounted on the upper surface of cam wheel 12. This first arm 27 is gradually caused to rise by sliding up the relatively long sloping surface 30 of the cam 29—overcoming the bias of spring 26 and causing the second arm 28 of the index wire 25 to move out of engagement with the notch in the locator wheel 24. By moving the second arm 28 of the index wire out of the control area of locator wheel 24, rotating trigger finger 15 is permitted upon contact with a tooth of the trigger wheel 16 to rotate wheel 16 and cause shaft 17 to rotate one-fifth of a revolution. This movement of shaft 17 causes driving rollers 18 and 19 to advance the slide film one picture frame or transparency by rolling friction. The first arm 27 continues to slide over the camming surface of cam 29 until it reaches the relative steep sloping surface 31. It then slides down this surface thereby permitting spring 26 to once again urge the second arm 28 of index wire 25 down into the next following notch of locator wheel 24. As index wire moves into locking engagement with this notch, any misalignment of shaft 17 with respect to each rotation of cam wheel 12 is corrected. Since each notch of wheel 24 corresponds to a given transparency location, proper positioning of the transparency for viewing purposes is achieved.

FIG. 3 illustrates graphically a cycle of operation wherein the slide film is advanced one picture frame or transparency frame during a 15 second interval corresponding to one rotation of cam wheel 12 when turntable 2 is turning at the rate of 33⅓ r.p.m. In FIG. 3 time is plotted as the abscissa in seconds and various occurrences as the ordinate. FIG. 3a provides a time scale of 17 seconds. In FIG. 3b, the displacement of the indexing wire 25 is illustrated. During approximately the first 10 seconds, the indexing wire is not in contact with the camming surface of cam 29. During the next 2.5 seconds the first arm 27 of index wire 25 slides over the portion 30 of the camming surface and then over the flat portion 31 during another 2 seconds. It is during this last mentioned 2 second period that trigger finger has moved into engagement with a tooth of trigger wheel 16 as shown in FIG. 3c and causes the trigger wheel 16 and its shaft 17 to rotate one-fifth of a revolution. During this same period as shown in FIG. 3d, film slide 5 is being advanced one picture frame or transparency as the first arm 27 of index wire 25 slides relatively rapidly down the relatively steep slope 31 of the camming surface of cam 29, as shown in the last half second in the 15 second interval of FIG. 3b, the trigger finger has already moved out of driving engagement with trigger wheel 16 as shown in FIG. 3c. For purposes of illustration, this particular cycle of operation is exaggerated to show the shaft 17 out of misalignment with the rotation of wheel 12. Thus as the first arm 27 slides down the portion 32 of the camming surface of cam 29, the second arm 28 in reaching the bottom of the next notch in locator wheel 24 under urging of spring 26 causes the slide film to continue to advance as shown in 3d until proper alignment of shaft 17 is achieved and proper indexing of the next picture frame is realized.

While a specific embodiment has been shown and described, it will of course be understood that various modifications may yet be devised by those skilled in the art which will embody the principles of the invention and found in the true spirit and scope thereof.

What I claim is:

1. In a picture slide changer, an arrangement for advancing a picture slide advance shaft step by step comprising a star wheel and a sprocket wheel keyed to said slide advance shaft, a drive wheel having a drive tooth for intermittently engaging said sprocket wheel to drive said sprocket wheel, means for locking said star wheel automatically against rotation when said drive tooth moves out of engagement with said sprocket wheel, said drive wheel having a camming surface, said locking means comprising a first arm resiliently urged to follow said camming surface and a second arm resiliently urged to engage said star wheel for locking said star wheel, said first arm responsive to a first camming action of said camming surface to move said second arm out of locking engagement with said star wheel automatically when said drive tooth moves into driving engagement with said sprocket wheel and for maintaining said second arm out of locking engagement with said star wheel during the period when said drive tooth is driving said sprocket wheel, said first arm responsive to a second camming action of said camming surface for returning said second arm into locking engagement with said star wheel automatically when said tooth moves out of driving engagement with said sprocket wheel.

2. An intermittent picture advancing mechanism comprising a first wheel mounted for angular rotation about a first axis, a cam having a camming surface and a drive finger located on said wheel and adapted for angular rotation about said first axis, a driven shaft carrying a second wheel having a plurality of teeth and a third wheel having a plurality of notches and a film feeding wheel, a U-shaped lever having one arm serving as a follower finger and a second arm serving as a locking finger, said locking finger adapted to engage said third wheel in the region of its notches to lock said third wheel and said driven shaft against rotation, said follower finger responsive to a first camming action of said camming surface and rotation about said first axis for disengaging said locking finger from said third wheel to permit rotation of said third wheel and said driven shaft, said drive finger responsive to rotation about said first axis for drivingly engaging a tooth of said second wheel to cause an intermittent rotation of said driven shaft during the period said locking finger is disengaged from said third wheel, said follower finger responsive to a second camming action of said camming surface and rotation about said first axis for engaging said locking finger with said third wheel to lock said third wheel and said driven shaft against rotation, said drive finger responsive to rotation about said first axis for disengaging itself from said second wheel during the period said driven shaft is locked against rotation.

3. An intermittent picture advancing mechanism comprising a control means, said control means comprising a cam having a camming surface and a drive finger each adapted for angular rotation about a first axis, a driven shaft adapted for rotation about a second axis orthogonal to said first axis, a first wheel coupled to said shaft having a plurality of teeth, a second wheel coupled to said shaft and having a plurality of notches, a film feeding wheel coupled to said shaft, a U-shaped lever having one arm serving as a follower finger and a second arm serving as a locking finger, said locking finger adapted to engage said second wheel in the region of its notches to lock said driven shaft against rotation, said follower finger responsive to a first camming action of said camming surface and rotation about said first axis for disengaging said locking finger from said second wheel to permit rotation of said driven shaft, said drive finger responsive to rotation about said first axis for drivingly engaging a tooth of said wheel to cause an intermittent rotation of said driven shaft during the period said locking finger is disengaged from said second wheel, said follower finger responsive to a second camming action of said camming surface and rotation about said first axis for engaging said locking finger with said second wheel to lock said driven shaft against rotation, said drive finger responsive to rotation about said first axis for disengaging itself from said first wheel during its locked position, and means coupled to said driven shaft and responsive to intermittent rotation of said driven shaft to intermittently advance said pictures.

4. An arrangement for advancing a film slide drive shaft step by step in rotation about a first axis comprising a locking means and a driven means carried by said shaft, a drive wheel adapted for continuous rotation about a second axis orthogonal to said first axis, means for rotating said shaft an angular distance corresponding to one step of film slide advance comprising a trigger finger extending radially from said drive wheel and adapted to drivingly engage said driven means only during a portion of the time for one rotation of said drive wheel about said second axis, said drive wheel having a camming surface, means for locking said shaft automatically against rotation when said drive wheel trigger finger moves out of engagement with said driven means, said locking means comprising a first and second arm, resilient means urging said second arm towards said locking wheel for locking said locking wheel against rotation and urging said first arm against said camming surface, said first arm responsive to a first camming action of said camming surface for overcoming the urging of said resilient means to move said second arm out of locking engagement with said locking means substantially as said trigger finger moves into driving engagement with said driven means, said first arm responsive to a second camming action of said camming surface and the urging of said resilient means to move said second arm into locking engagement with said locking means substantially as said trigger finger moves out of driving engagement with said driven means.

5. A picture slide changer comprising a slide advance shaft, an arrangement for advancing said slide advance shaft step by step comprising a first means and a second means keyed to said slide advance shaft, driving means for intermittently engaging said second means to intermittently rotate said second means, means for locking said first means automatically against rotation when said driving means moves out of engagement with said second means, a cam having a camming surface, said locking means comprising a first arm resiliently urged to follow said camming surface and a second arm resiliently urged to engage said first means for locking said first means against rotation, said first arm responsive to a first camming action of said camming surface to move said second arm out of locking engagement with said first means automatically when said driving means moves into driving engagement with said second means and for maintaining said second arm out of locking engagement with said first means during the period when said driving means is rotating said second means, said first arm responsive to a second camming action of said camming surface for returning said second arm into locking engagement with said first means automatically when said driving means moves out of driving engagement with said second means.

6. An arrangement for coordinating the sequential display of a series of pictures mounted in a slide holder with the playing of a phonograph record, comprising a drive shaft for advancing said pictures for display purposes, said drive shaft adapted to rotate step by step about a first axis, a toothed wheel coupled to said shaft and adapted to rotate about an axis, a notched locking wheel coupled to said shaft and adapted to rotate about an axis, a drive wheel adapted for continuous rotation about a second axis orthogonal to said first axis, means for rotating said shaft an angular distance corresponding to a one step advance of said pictures comprising a trigger finger on said drive wheel rotating about said second axis and adapted to drivingly engage a tooth of said toothed wheel when the positions of said trigger finger and a tooth of said toothed wheel coincide, said drive wheel having a camming surface, means for locking said shaft automatically against rotation when said trigger finger moves out of engagement with a tooth of said toothed wheel, said locking means comprising a first and second arm, resilient means urging said second arm towards a notch in said locking wheel for locking said locking wheel against rotation and urging said first arm against said camming surface, said first arm responsive to a first camming action of said camming surface for overcoming the urging of said resilient means to move said second arm out of locking engagement with said locking wheel substantially as said trigger finger moves into driving engagement with a tooth of said toothed wheel, said first arm responsive to a second camming action of said camming surface and the urging of said resilient means to move said second arm into locking engagement with said locking wheel substantially as said trigger finger moves out of driving engagement with said toothed wheel.

7. An arrangement for coordinating the sequential display of a series of pictures mounted in a slide holder with the playing of a phonograph record wherein the slide holder is adapted to be advanced intermittently with respect to a first axis and the record is adapted to be rotated continuously with respect to a second axis comprising a drive shaft for advancing said pictures for display purposes, said drive shaft adapted to rotate step by step about said first axis, a toothed wheel coupled to said shaft for rotation about said first axis, a notched locking wheel coupled to said shaft for rotation about said first axis, a drive wheel adapted for continuous rotation about said second axis orthogonal to said first axis, means for rotating said shaft an angular distance corresponding to a one step advance of said pictures comprising a trigger finger on said drive wheel and adapted to rotate about said second axis to drivingly engage a tooth of said toothed wheel when the positions of said trigger finger and a tooth of said toothed wheel coincide, said drive wheel having a camming surface, means for locking said shaft automatically against rotation when said trigger finger moves out of engagement with a tooth of said toothed wheel, said locking means comprising a first and second arm, resilient means urging said second arm towards a notch in said locking wheel for locking said locking wheel against rotation and urging said first arm against said camming surface, said first arm responsive to a first camming action of said camming surface for overcoming the urging of said resilient means to move said second arm out of locking engagement with said locking wheel substantially as said trigger finger moves into driving engagement with a tooth of said toothed wheel, said first arm responsive to a second camming action of said camming surface and the urging of said resilient means to move said second arm into locking engagement with said locking wheel substantially as said trigger finger moves out of driving engagement with said toothed wheel.

8. An arrangement for coordinating the sequential display of a series of pictures mounted in a slide holder with the playing of a phonograph record wherein the slide holder is adapted to be advanced intermittently with respect to a first axis and the record is adapted to be rotated continuously with respect to a second axis comprising a drive shaft for advancing said pictures for display purposes, said drive shaft adapted to rotate step by step about said first axis, a toothed wheel coupled to said shaft for rotation about said first axis, a notched locking wheel coupled to said shaft for rotation about said first axis, a drive wheel adapted for continuous rotation about said second axis orthogonal to said first axis, means for rotating said shaft an angular distance corresponding to a one step advance of said pictures comprising a trigger finger on said drive wheel and adapted to rotate about said second axis to drivingly engage a tooth of said toothed wheel when the positions of said trigger finger and a tooth of said toothed wheel coincide, said drive wheel having a camming surface, means for locking said shaft automatically against rotation when said trigger finger moves out of engagement with a tooth of said toothed wheel, said locking means comprising a first and second arm, resilient means urging said second arm towards a notch in said locking wheel for locking said locking wheel against rotation and urging said first arm against said camming surface, said first arm responsive to a first camming action of said camming surface for overcoming the urging of said resilient means to move said second arm out of locking engagement with said locking wheel substantially as said trigger finger moves into driving engagement with a tooth of said toothed wheel, said first arm responsive to a second camming action of said camming surface and the urging of said resilient means to move said second arm into locking engagement with said locking wheel substantially as said trigger finger moves out of driving engagement with said toothed wheel, means coupled to said shaft and adapted to engage the holder of said pictures, said last-named means responsive to intermittent rotation of said shaft to intermittently advance said pictures.

References Cited by the Examiner
UNITED STATES PATENTS

| | | | |
|---|---|---|---|
| 259,735 | 6/1882 | Welker | 226—145 X |
| 1,979,700 | 11/1934 | May | 352—189 X |
| 2,425,704 | 7/1947 | Nemeth | 88—28 |
| 2,513,673 | 7/1950 | Prell | 88—28 |
| 2,559,509 | 7/1951 | Mercier et al. | 352—188 X |
| 2,596,581 | 5/1952 | Mercier | 352—188 X |
| 2,633,773 | 4/1953 | Frederick | 226—144 |

FOREIGN PATENTS 875,728  10/1942  France.

NORTON ANSHER, *Primary Examiner.*

VANCE A. SMITH, *Assistant Examiner.*